May 27, 1941. J. H. VAN UUM 2,243,322
RESILIENT SECURING DEVICE FOR BEAD TRIM
Filed July 16, 1936

INVENTOR.
John H. Van Uum,
BY
J. Harrow Leonard,
his ATTORNEY.

Patented May 27, 1941

2,243,322

UNITED STATES PATENT OFFICE 2,243,322

RESILIENT SECURING DEVICE FOR BEAD TRIM

John H. Van Uum, Lakewood, Ohio

Application July 16, 1936, Serial No. 90,901

2 Claims. (Cl. 24—73)

This invention relates to retaining spring clip devices for securing a plurality of elements together in firm superimposed relationship and particularly to clips such as described generally in my co-pending applications Serial No. 83,251, filed June 3, 1936, and Serial No. 85,891, filed June 18, 1936.

The utility of the invention is best illustrated in connection with securing the various styles of decorative bead trim strips to automobile bodies, fenders, metal furniture, and the like.

Heretofore, in securing such trim strips to automobile bodies, for example, the practice has been to provide in that portion of the body to which the bead trim strip is to be secured, a number of spaced apertures and to secure to the bead trim strip, before installation thereof on the body, a number of spring clip devices, these devices being spaced apart on the trim strip a distance corresponding accurately with the spacing of the apertures in which they are to be received. Thereupon the bead trim strip is installed on the body by forcing the clips through the aligned apertures. This system of installation has several very serious objections, the most important objection being that slight inaccuracies in spacing of the clips on the bead trim strip necessitate careful repositioning of the clips as the bead trim is being installed so that the clips are brought into proper alignment with the apertures. If the bead trim is partially installed before this inaccuracy in spacing is discovered, it is quite often necessary for the workman to distort the strip to enable him to reposition the clips properly. In so doing, the strip often is permanently damaged.

Many attempts have been made to overcome these objections by the provision of spring clips which can be installed directly in the apertures preparatory to connecting the bead trim thereto but no practical clip for this purpose thus far has been provided.

One of the principal objects of the present invention, therefore, is to provide a spring clip device for securing bead trim or the like to apertured supports, which spring clip devices may be installed in the apertures preparatory to their connection to the bead trim and to which the bead trim may then be connected merely by snapping it into place thereonto, regardless of the particular spacing of the devices along the support or trim strip. By this device a greater speed and efficiency in the application of the bead trim to the supporting member is attained.

Another object of the invention is to provide a clip for this purpose wherein the spring effect of the trim strip engaging portions is not dependent upon the flexure of the aperture engaging portions, but in which both portions mutually assist and augment the holding effect of the clip.

A more specific object is to provide a clip which, when installed in the apertured support and engaged by the bead trim, yieldably draws the trim into firm juxtaposition with the support and will remain permanently in position with little or no tendency to become dislodged, loosened or separated.

Another object is to provide a clip of this character formed of a single piece of spring metal and which may be cheaply manufactured by quantity production methods.

Other objects and advantages will become apparent in the following specification wherein reference is made to the drawing, in which.

Figure 1:
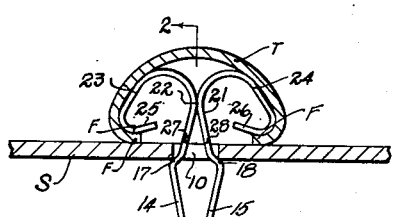
Fig. 1 is a sectional view through a channel member and support showing my retainer clip in position.

Trim for various uses, such as beading for decoration for metal furniture, and as heretofore mentioned, for use in the trim of automobiles, such as radiators, hoods and bodies, now widely used in the form approximately as shown in the drawing, requires to be very rapidly applied and to be very firmly held in place, and usually comprises a channel having a partial open side or slot at which terminate inturned flanges.

For the purpose of illustration, one form of the clip is shown for use in connection with the bead trim of a type now commonly used in automobile body decoration, which trim comprises an elongated, hollow rolled strip of metal having inturned flanges at its lateral margins, the outer surface of the strip being suitably decorative. Such a bead trim strip is illustrated in Figs. 1, 2, 3 and 5, and comprises a main body portion T having inturned flange portions F. As is customary, the bead trim strip is installed on a support S which has a plain surface providing no suitable projecting parts for attachment of the strip. When making the attachment, therefore, the support is usually provided with a series of apertures 10 in which clips of this general character are inserted and cooperate with the support and bead trim strip for holding the bead trim in position.

As set forth in the objects, it is desirable to install the retaining clip in the support prior to its installation on the trip strip T. A clip, generally indicated at 12, for this purpose is illustrated in Fig. 1 and comprises a flat strip of spring metal or the like bent intermediate its end portions to provide a rounded nose portion 13 from which extend divergent leg portions 14 and 15, respectively, defining a substantially V-shaped loop. Intermediate the free end of each leg portion and the rounded nose portion, each leg portion is bent inwardly abruptly to provide outwardly facing, sloping, locking shoulders. These shoulders, designated at 17 and 18 respectively, are arranged for gripping engagement with the inner face of the support S when the legs are sprung through the associated aperture 10 and return toward their normally unflexed condition.

It will be noted that the sloping portions and the locking shoulders 17 and 18 are turned inwardly abruptly, which provides for securely gripping beneath the support, and the sloping shoulders compensate for varying thickness of the support and tend to pull or cam the trim member to the support when the spring clip is placed in position.

In the form shown in Figs. 1 to 4 inclusive, the strip extends beyond the shoulders 17 and 18, providing intermediate converging leg portions 20 and 21, which contact or abut, as at 22, and then extend beyond the abutting portion and turn back a sufficient distance to contact the flange members F of the particular bead trip strip T and provide head members 23 and 24 terminating in inturned margins. The margins provide bead trim engaging shoulders 25 and 26, the shoulders 25 and 26 being operatively opposed to shoulders 17 and 18 and disposed outwardly of the supports.

Figure 2:
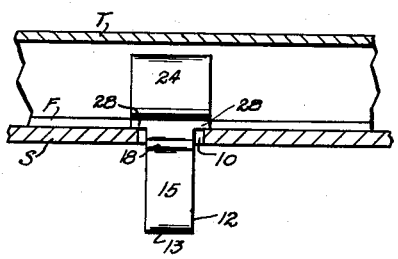
Fig. 2 is a longitudinal section of the same showing a retainer clip in elevation, the plane of the section being indicated by the line 2—2 of Fig. 1.
Figure 4:
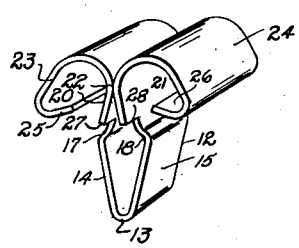
Fig. 4 is a perspective view of the retainer member illustrated in Fig. 1.

It will be seen in Figs. 2 and 4 that the intermediate portions 20 and 21 and the head members 23 and 24 may be wider parallel to the face of the strip stock than the V-shaped portion to provide feet or overhanging land shoulders 27 and 28. The feet or land shoulders 27 and 28 cooperate both with the sloping locking shoulders 17 and 18 to rigidly position and secure the retaining clip 12 in the supporting member S and also space the head portions 23 and 24 a predetermined distance from the said support to allow the flange members F of the bead trim to be gripped between and held in firm juxtaposition with the said head portions 23 and 24 and the said supporting member.

Several distinct advantages result from this structure. It will be noted in connection with Fig. 1 that when the legs 14 and 15 are inserted through the aperture 10, the legs are flexed toward each other about the rounded nose 13 until the abutment portions 20 and 21 come into contact, as at 22. As soon as these portions contact, continued bodily movement of the legs by flexure of the legs about the rounded nose portion 13 is prevented, and the legs thereupon are constrained to flex along the intermediate portions between the nose 13 and the abutting portions 20 and 21. Thus a much more pronounced spring action, derived from and utilizing the full spring effect of the resilient legs, is provided for urging the legs relatively apart intermediate their ends for effecting firm engagement to the shoulders 17 and 18 with the inner face of the support S adjacent the aperture 10. Again when the trim is snapped into place over the head portions, the engagement of the intermediate portions 20 and 21, prevents relative bodily inward movement of the legs 14 and 15 toward each other, which might overcome the gripping effect of the legs if permitted to exist. Instead, the entire spring effect for holding the trim on the head portions is segregated from the legs and results entirely from the head portions 23 and 24. Thus neither is directly dependent on the other and undue stressing of the clip by either the bead trim or the support does not affect the gripping effect of the other.

Another important cooperative relation is provided. As mentioned before, the land shoulders 27 and 28 hold the head portion of the clip in a proper spaced position from the support S so that the flanges F of the trim can readily be initially received between the clip and support. However, the clearance between the shoulders 25 and 26 and the support S is less than the thickness of the trim. Thus when the clip is sprung into engagement with the trim, the interposition of the flanges F of the trim between the shoulders 25 and 26 and the support S, yieldably urges the clip outwardly parallel to the axis of the aperture 10. This, in turn, draws the shoulders 17 and 18 into firm engagement with the inner face of the support S so that the clip is held fixedly in position by the cooperation of the inner shoulders 17 and 18 and the outer shoulders 25 and 26 which are in opposition thereto, the trim and the support being drawn into firm juxtaposition thereby.

Figure 3:
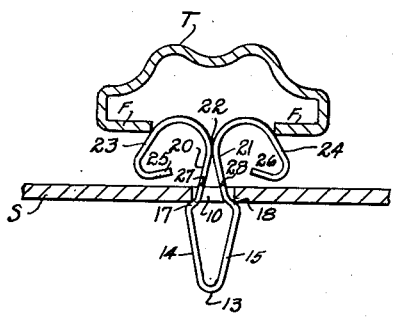
Fig. 3 is a sectional view showing a retainer clip in place in the support and illustrates the manner in which a trim member is applied.

In securing the bead trim strip in the present case, the spring clips 12 are first inserted in the openings 10 of the support S and are held in proper position by the cooperation of the sloping or locking shoulders 17 and 18 and the land shoulders 27 and 28. The bead trim strip T is then placed above the head portions 23 and 24 of the spring clip and is snapped into position, as illustrated in Fig. 3, by applying the necessary pressure upon the bead trim to cause the head portions to contract and pass between the spaced inturned flanges F, whereupon the head portions expand to permanently lock or secure the spring clip to the supporting member and the bead trim and thereby lock the trim to the support.

Figure 5:
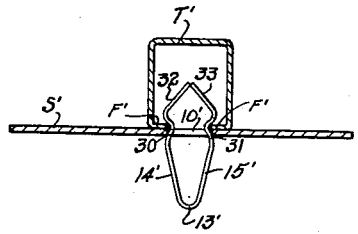
Fig. 5 is a sectional view similar to Fig. 1, showing a modified form of retaining clip for securing the bead trim to a supporting member.
Figure 6:
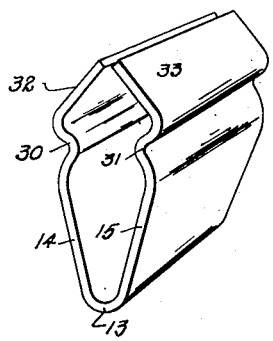
Fig. 6 is an enlarged perspective view of the retaining device illustrated in Fig. 5.

The modified form of my retainer clip illustrated in Figs. 5 and 6 shows another manner in which a clip may be formed to possess the aforementioned advantages. In this form, a single strip of uniform width of spring steel or the like is bent intermediate its end portions to form the rounded nose portion 13' and is flared outwardly and upwardly to form sloping leg portions 14' and 15', and then bent inwardly and abruptly outwardly and again inwardly to form locking shoulders as at 30 and 31, corresponding in operation to the shoulders 17 and 18. The strip then extends upwardly and inwardly to provide the sloping head members 32 and 33 which are normally separated, as illustrated in Fig. 6, but which are forced into abutting relation when the clip is sprung into position, as illustrated in Fig. 5.

The retainer clip, illustrated in Figs. 5 and 6, is applied in the same manner as the clip illustrated in Figs. 1 to 4 inclusive, and is first inserted into the openings 10' of the supporting member S'. The bead trim member T' is then placed above the head members 32, 33, of the retainer clip and is snapped into position by applying the necessary pressure upon the bead trim to cause the head members to contract and spring between the spaced inturned flanges F', and then re-expand to permanently lock or secure the spring clip to the supporting member.

As above stated, the head members 32 and 33 are normally separated but contact when the clip is forced into position and the clip exerts more outward pressure upon the openings than an open end clip for the same reason as stated in connection with the device illustrated in Figs. 1 to 4 inclusive, and also produces in effect a continuous loop spring clip.

The gripping action of the legs and head members of the devices illustrated in the drawing is so effective that the bead trim may be made straight and be bent around the curved portions of an automobile body or the like, and gripped by the head members of the clips protruding from their respective openings, as it is bent. The gripping or retaining action of these clips is sufficient to not only firmly hold the channel trim against inadvertent movement but also to prevent its removal except by compression of the clip from the opposite side of the supporting member.

It will be seen from the foregoing description that I have provided a simple, efficient retaining spring clip device which is formed with high production tools and with corresponding economies of manufacture. The device simplifies the application of a bead trim member to a supporting member by the rapid assembly made possible by the design of the clip.

It is understood that various modifications and alterations may be made in the retaining device and bead trim illustrated, without departing from the spirit and scope of the present invention.

Having thus described my invention, what I claim is:

1. A spring clip for securing a member having an opening to an apertured support and comprising a strip of spring metal having a portion between its ends in the form of a nose and legs extending therefrom, said legs being receivable endwise in said aperture and having portions in the form of locking shoulders arranged for engagement with the inner face of the support when the clip is installed therein, and said strip having widened portions beyond the legs and convergent part way of their length and reversely curved for a predetermined portion of the remainder of their length and inwardly convergent therebeyond and in the form of inturned shoulder portions spaced longitudinally of the clip from the locking shoulders and adapted for engagement with the opening in the member, said convergent portions having portions in the form of lands arranged for engagement with the outer face of the support to position the inturned shoulder portions outwardly in spaced relation to the support when the clip is in position in the aperture, whereby said inturned shoulder portions may be snapped into engagement with said member through the opening thereof while the securing device is positioned in the aperture of the support.

2. A snap fastener device of the class described formed entirely from a single piece of spring metal for securing two apertured members together, one portion of said device having a pair of bowed legs connected at one end and converging into close proximity at the other end, and another portion comprising two parts each formed as a continuation from one of said closely proximated ends upwardly and outwardly from the respective leg, then downwardly toward the leg, the legs being adapted to engage in the aperture of one of the apertured members and the downwardly extending parts being adapted to engage in the aperture of the other apertured member and the closely proximated ends acting as fastener tension controlling means as and for the purposes described.

JOHN H. VAN UUM.